United States Patent [19]

Stungis et al.

[11] 3,818,335

[45] June 18, 1974

[54] SYSTEM AND METHOD FOR DETECTING AMOUNTS OF CONDUCTIVE MATERIAL ON A MOVING WEB

[75] Inventors: George E. Stungis; Steven L. Merker, both of Louisville, Ky.

[73] Assignee: Brown & Williamson Tobacco Corporation, Louisville, Ky.

[22] Filed: Oct. 9, 1973

[21] Appl. No.: 404,585

Related U.S. Application Data

[63] Continuation-in-part of Ser. No. 244,714, April 17, 1972.

[52] U.S. Cl............... 324/65 R, 118/8, 118/9, 131/9, 131/15 B
[51] Int. Cl............................................. G01r 27/02
[58] Field of Search....... 324/65 R, 65 P, 64; 118/7, 118/8, 9; 131/9, 15 B

[56] References Cited
UNITED STATES PATENTS

| | | | |
|---|---|---|---|
| 1,573,174 | 2/1926 | Lasker, Jr. | 324/65 R X |
| 1,915,028 | 6/1933 | Meyer-Jagenberg | 324/65 R X |
| 2,377,783 | 6/1945 | Hood | 324/65 R X |
| 2,765,405 | 10/1965 | Gamarekian | 324/65 R |
| 2,941,144 | 6/1960 | Cannon | 324/65 R X |
| 3,602,190 | 8/1971 | Kral, Jr. et al. | 324/65 R X |
| 3,667,469 | 6/1972 | Sanford et al. | 131/15 B |
| 3,699,972 | 10/1972 | Frisch | 131/9 |

Primary Examiner—Stanley T. Krawczewicz
Attorney, Agent, or Firm—Vance A. Smith

[57] ABSTRACT

Detection of amounts of conductive material applied in patterns of discrete areas in a columnar pattern along an endless, non-conductive web is accomplished through the generation of an interrupted pulsed signal corresponding to the conductivity of the discrete areas between two points and the integration of the pulsed signals into a continuous signal which is compared to a signal of value predetermined to correspond to a desired conductivity value. A means detecting or comparing differences between the value of the generated continuous signal and the signal of predetermined value actuates an alarm or an indicating signal, thereby indicating that improper amounts of material are being applied to the web. A second indicating signal may be generated when smearing of the conductive material occurs along the length of the web.

13 Claims, 6 Drawing Figures

PATENTED JUN 18 1974 3,818,335

SYSTEM AND METHOD FOR DETECTING AMOUNTS OF CONDUCTIVE MATERIAL ON A MOVING WEB

RELATED INVENTIONS

This application is a continuation-in-part of commonly assigned Application Ser. No. 244,714 filed Apr. 17, 1972.

BACKGROUND OF THE INVENTION

Various techniques have been devised for the monitoring of conducting material on an endless web. U.S. Pat. No. 3,602,190, for example, teaches controlling the deposition of conductive material on a moving dielectric sheet through a feedback control system. Conductive material is deposited as long stripes along the web. The resistance of the stripes is continuously measured over a predetermined length of the material and a continuous signal is generated in proportional response to the measured resistance to control the metal deposition rate.

Another U.S. Pat. No. 2,941,144 discloses a device for detecting the presence of electrically conducting particles in a web of insulating material. A web of insulating material is moved over the surface of an electrically conducting roll. An electrically conducting blade is in contact with the opposite side of the web. Conducting particles, evidently undesirable and randomly positioned, in the web moving between the blade and conducting roll are sensed, due to the changed electrical characteristics existing between blade and roll.

For various reasons, practical and economical, such prior teachings do not disclose viable ways of monitoring amounts of conductive material applied on an endless web when the material is arranged in repeating patterns of discrete areas on the web surface. It is imperative that such monitoring be conducted as part of an in-line operation. Because the web moves rapidly, it is not feasible to individually determine the amount of conductive material in each discrete area. Thus, it is necessary and a primary object of the present invention to provide a monitoring system and method of detecting which continuously detects and indicates changes in the applied amount of the conductive material.

SUMMARY OF THE PRESENT INVENTION

In accordance with the present invention, a system for monitoring and detecting applied amounts of conductive material on a moving, non-conductive web is provided comprising a means for generating an interrupted pulse signal in proportional response to the conductivity of a discrete areas moving between a pair of spaced probes in contact with a moving web, a means for integrating the interrupted pulse signals into a continuous signal corresponding to the level of conductivity of the discrete areas, and a means responsive to the continuous signal for detecting or comparing differences between the value of the continuous signal and a value of a predetermined value. The predetermined value may correspond, for example, to the minimum conductivity desired and, therefore, to the minimum amount of conductive material being applied on the discrete areas of the web.

In a more specific environment, the conductive material is applied in a checkerboard pattern on the web where the rectangular checks are arranged in columns. A pair of probes is employed for each column and another pair of parallel contacts is arranged at right angles to the motion of the web. Each column is monitored for appropriate application of conductive material, while the parallel contacts and related circuitry monitor for smearing of the conductive areas.

BRIEF DESCRIPTION OF THE DRAWINGS

The features of the present invention which are desired to be protected are pointed out with particularity in the appending claims. The invention itself, together with further objects and advantages thereof, may be best understood with reference to the following description taken in connection with the appending drawings in which:

The apparatus and method described herein may find beneficial use in any continuous operation where it is desired to coat any moving endless web with a columnar pattern of "discrete areas" of material in specified amounts. For example, in the on-line printing of solid state circuitry, it is often necessary to insure that appropriate amounts of conductive material are being applied to the predetermined patterns on a web. The predetermined patterns are repeated for each individual card and, thus, in many cases may form columns. The individual cards may be separated from the web in a subsequent severing stage. Similarly, in the high speed printing of patterned paper, where the patterns comprise separate but repeating areas, it is desirable that the material comprising the print be applied in specific amounts to maintain the desired quality and contrast between print and paper.

The necessary requirements for employing the invention as described herein is that (1) the material added to the web be conductive to an electric current while the web is not and (2) the material added be applied in a pattern comprised of discrete areas which are repeated longitudinally along the web. It is contemplated that, where the material being added to the web is not conductive ordinarily, a conductive ingredient may be incorporated into the material thereby providing conductivity to the material.

"Discrete area" as used herein refers to an area of the web which has been coated or printed with a material which is conductive relative to surrounding uncoated areas. The discrete areas, as the definition indicates, do not touch one another.

While the description hereinafter refers to a specific use of the monitoring system and method of the present invention, it should be understood from the description hereinbefore that other uses are contemplated also.

The specific use is the monitoring and detecting additive levels of ingredients printed or coated on endless webs of cigarette paper in discrete areas arranged in a pattern. U.S. Pat. No. 3,667,479 refers to cigarette paper having a pattern of discrete areas, for example, a checkerboard pattern, printed thereupon with a burn control additive, preferably a strong combustion-supporting oxidizing agent. This agent may be sodium chlorate, a conductive material, or some other combustion-supporting agent having a conductive ingredient added thereto.

Figure 1:
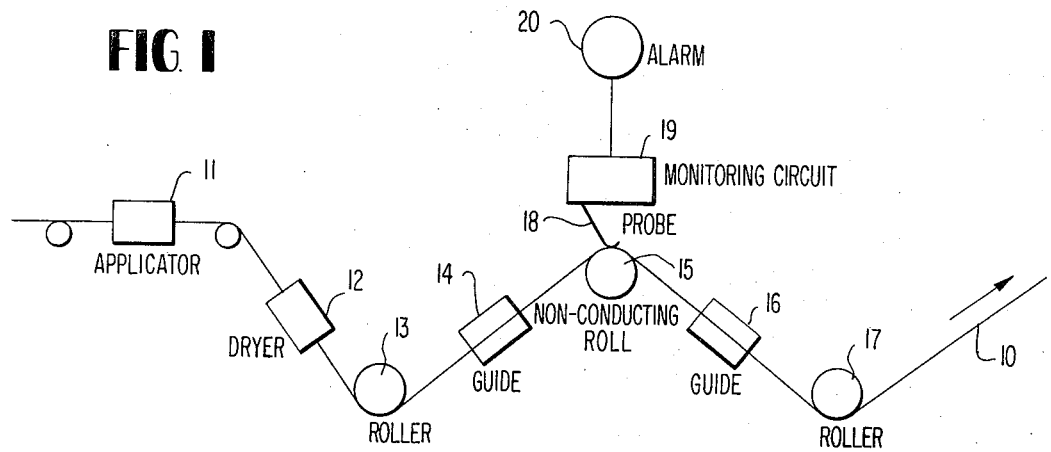
FIG. 1 is a schematic illustration of an assembly utilizing a detection system in accordance with the present invention.

As stated in U.S. Pat. No. 3,667,479, the burning coal causes the treated area to burn away quicker than the non-treated areas, allowing air to be drawn into the cigarette behind the coal. The resulting dilution of the smoke results in a decrease in the constituent delivery and correspondingly improves the taste of the smoke in these later puffs. It is necessary, however, that the pattern be carefully printed in a high speed operation upon the cigarette paper in such a manner and amounts to avoid too much (or too little) oxidizing agent to be applied to the paper and to avoid causing the discrete areas to merge into or touch one another. FIG. 1 depicts a schematic view of an apparatus or system which may be used in monitoring and detecting variations in the applied amount of the oxidizing agent and lateral uniformity (smearing).

As seen in FIG. 1, the endless web 10, which may be cigarette paper, for example, moves through the applicator 11 and dryer 12 under roller 13 to web guide 14 and then over a non-conducting roller 15. Thereafter, web 10 runs through another web guide 16 and under roller 17. As the web passes over non-conducting roller 15, a pair of spaced probes 18 make contact with and ride over web 10. The probes are positioned so as to make contact with each discrete area of coated or printed material. The probes may be made of any conductive material, such as steel wire, which is spring biased into contact with web 10. This may be best seen in FIG. 2.

Probes 18 are connected to the monitoring circuitry denoted generally as box 19 and to alarm or signal 20.

Figure 2:
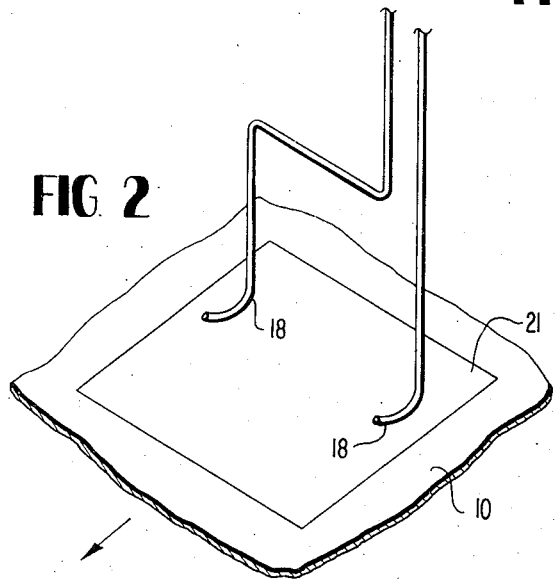
FIG. 2 is an illustration depicting a pair of probes in contact with a conducting discrete area.

FIG. 2 depicts spaced probes 18 in contact with a discrete area 21 of conductive material on web 10. The spacing between the probes is determined by the dimensions of the discrete area. Although two probes are required, it will be apparent that a plurality of probe pairs are required for a plurality of columns of discrete areas. Mountings and supports for the probe are not critical factors as long as the probes are securely attached and remain spaced properly. Pressure of the probes against the web is critical only to the extent that contact with the web is maintained and no web damage results.

Figure 3:
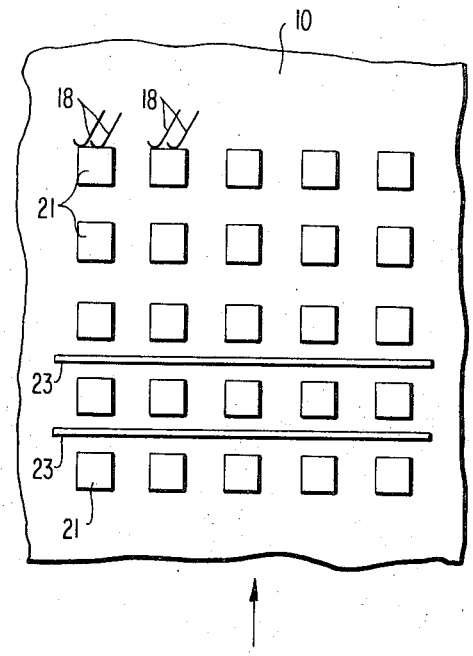
FIG. 3 is an illustration of five sets of probes together with a pair of smear detecting contacts associated with a web having a pre-selected pattern of generally rectangular areas arranged in parallel columns.

FIG. 3 depicts a paper web 10 as having a checkerboard pattern of discrete areas 21 of oxidizing material, such as sodium chlorate. The discrete areas form a predicted pattern having parallel columns of generally rectangular areas. Probes 18 are shown spaced properly for the dimensions of the rectangular discrete areas 21. Since there are five columns of areas 21, a corresponding number of probes are necessary. Also shown is another pair of spaced, parallel probes 23 positioned perpendicular to the movement of web 10. Probes 23 are spaced apart along two lines of contact with web 10 a distance slightly greater than the predetermined dimension of areas 21 along web 10. Probes 23 serve the purpose of monitoring or detecting the occurrence of smearing of the material applied to web 10. Smearing is detected when probes 23 concurrently contact an electrical path on the moving web, thereby completing an electric circuit.

Figure 4:
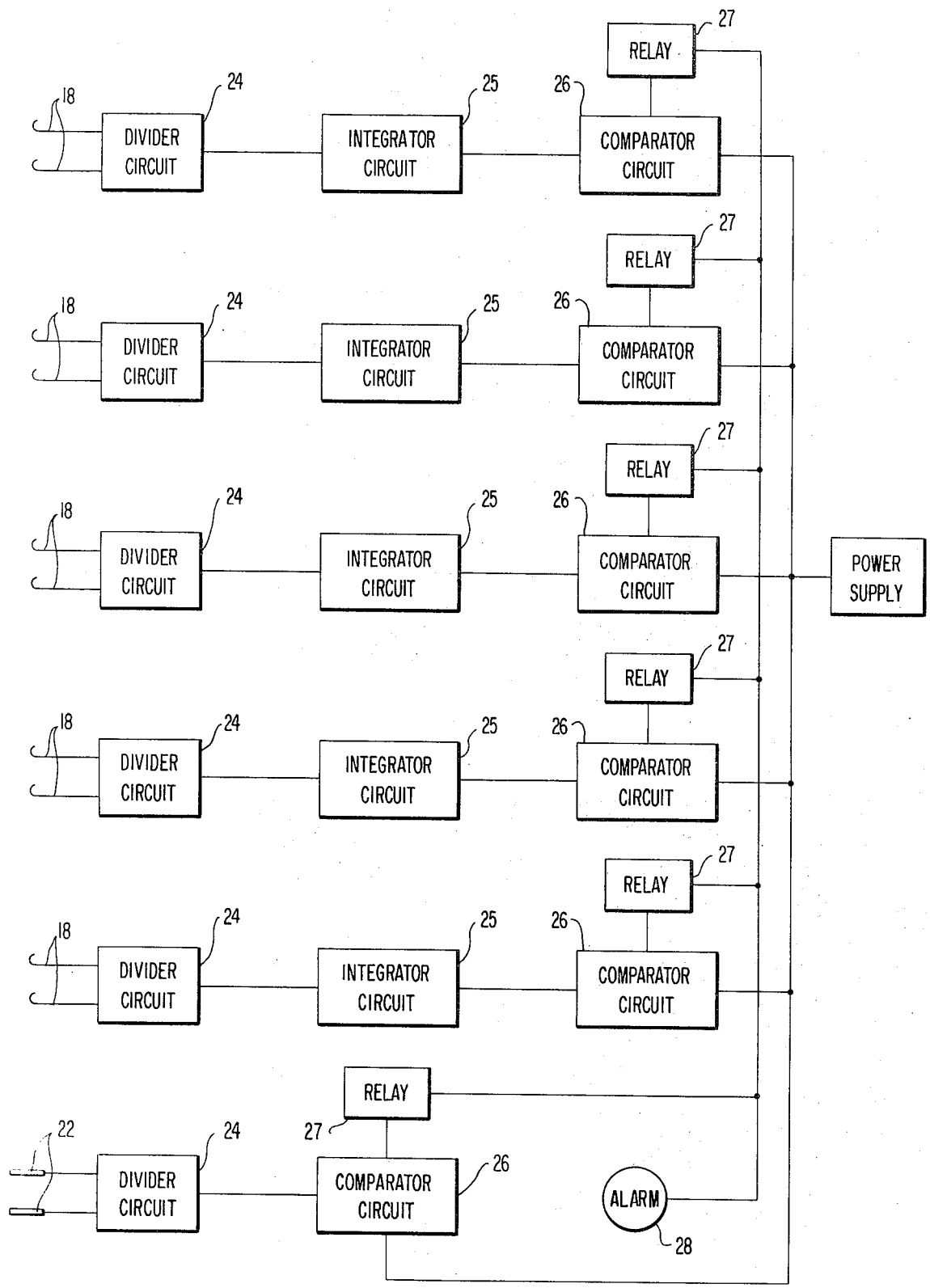
FIG. 4 is a diagramatic illustration of a monitoring and detecting system in accordance with the present invention.

Referring now to the diagram of FIG. 4, a plurality of paired probes 18, 23 are connected to a divider circuit 24. Each divider circuit 24 with the exception of the one connected to probes 23 has a corresponding integrator circuit 25 which is connected to a comparator circuit 26 and relay 27. An alarm 28 is in contact with each relay 27.

As the web with discrete areas passes beneath a pair of probes 18, a signal in pulse form is generated by the divider circuit, the signal pulse amplitude being proportional to the conductivity of the discrete area. As can be appreciated, the pulses are generated rapidly as each discrete area passes by. As in any in-line operation of this nature, it is desirable to monitor the overall application level rather than the application level of any one discrete area. Thus, it is necessary that a measurement or detection be made of the conductivity of a multiplicity of adjacent discrete areas arranged longitudinally along the web. The integrator circuit integrates the interrupted pulsed signals generated by the divider circuit into a continuous signal which is proportional to the conductivity of the discrete areas. The comparator circuit which receives the continuous signal is responsive to values of the continuous signal which are different from signal values corresponding to predetermined and desired conductivity. For example, the comparator circuit could become inactivated at a predetermined minimum continuous signal value, thereby activating a relay which sets off an alarm.

Figure 5:
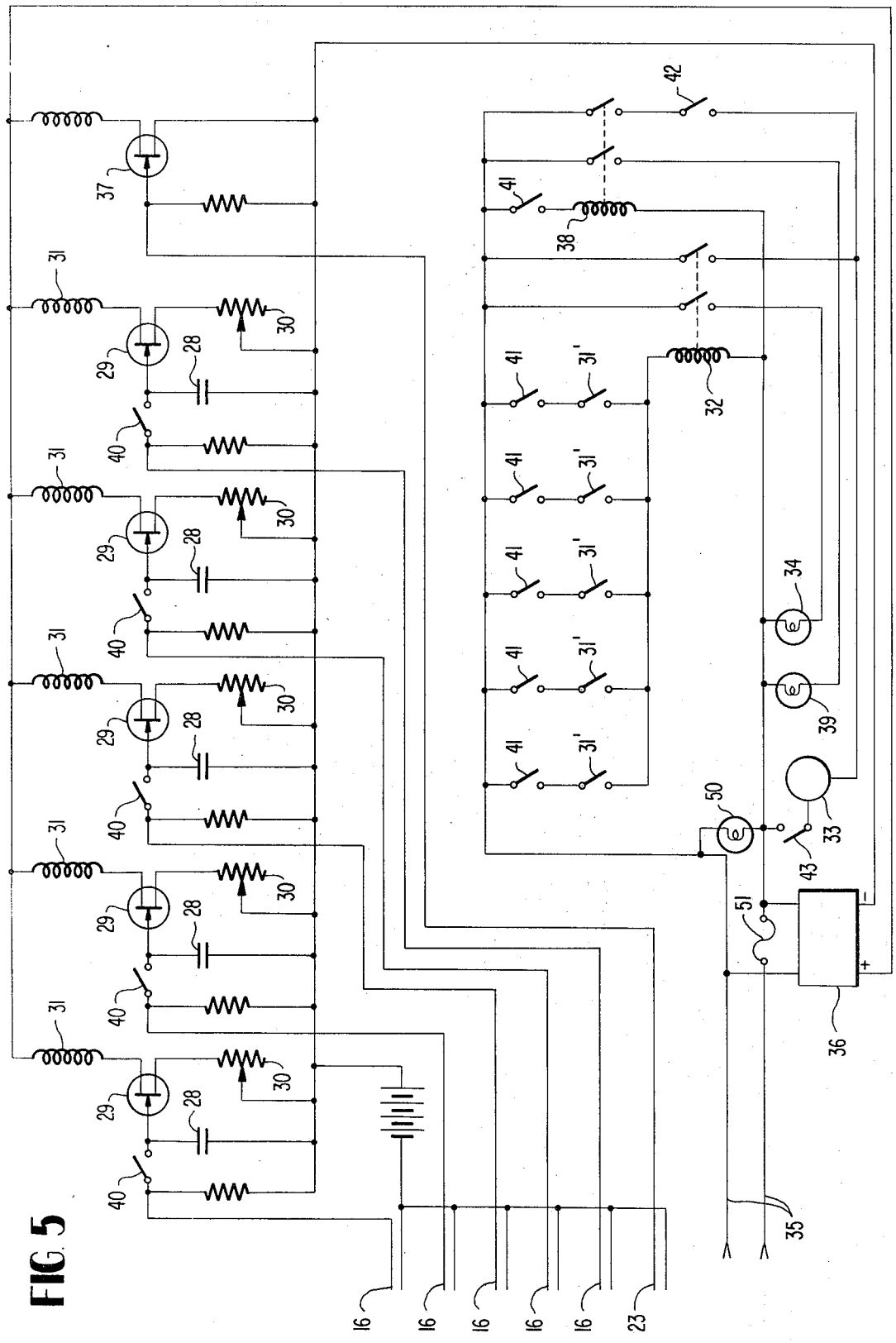
FIG. 5 is an electrical network schematic of the system of FIg. 4.

The electrical schematic of FIG. 5 sets forth the operating components of this system in more detail. When probes 16 make contact with a discrete area, an electrical current flows therebetween. The voltage drop across probes 16 (which form part of the divider circuit 24) is dependent upon the conductivity of the discrete area, the conductivity itself being a measurement of the amount of conductive material applied to the area. Thus, the amplitude of the pulse signal is proportional to the conductivity between the probes. An individual pulse charges capacitor 28 which begins to discharge essentially maintaining the amplitude as the next pulse is received. Consequently, the pulses are integrated into a continuous signal. The continuous signal then is received by field effector transistors 29 which are biased through variable resistor 30 so as to become non-conductive when the continuous signal drops below a predetermined value. When transistors 29 become non-conductive, relays 31, 31', and 32 are closed, completing a circuit, thereby activating alarm 33 and light 34 which indicate that insufficient amounts of material are being placed on the discrete areas of the web. The power source for lights and alarm comes from a.c. input 35 and d.c. source 36. The d.c. source 36 also provides the appropriate potential to transistors 29 and 37.

The width of the pulse is proportional to the dimension of the discrete area along the web. For any particular operation, however, the width is constant, since it is based upon mechanical parameters, such as printing speed and size. Thus, the width of the pulse is not critical to the invention.

The circuitry for probes 23 differ from probes 18 in that integration is unnecessary since conductivity levels are not being monitored. Probes 23 monitor only the presence of conductivity due to smearing. As shown in the schematic of FIG. 5, probes 23 are connected directly with field effect transistor 37 which is made non-conductive, should an electric current pass between probes 23. Upon such an occurrence, relay 38 is set to complete the circuit, allowing light 39 and alarm 33 to be energized, which indicates the presence of smearing.

Various switches 40, 41, 42, and 43 are employed as desired to inactivate any designated probe 18 circuitry and corresponding relays 35. Light 50 indicates when a.c. source 35 is energized. Fuse 51 is seen between light 44 and source 35. It should also be understood that tube circuitry, rather than solid state circuitry, may be employed as desired.

Figure 6:
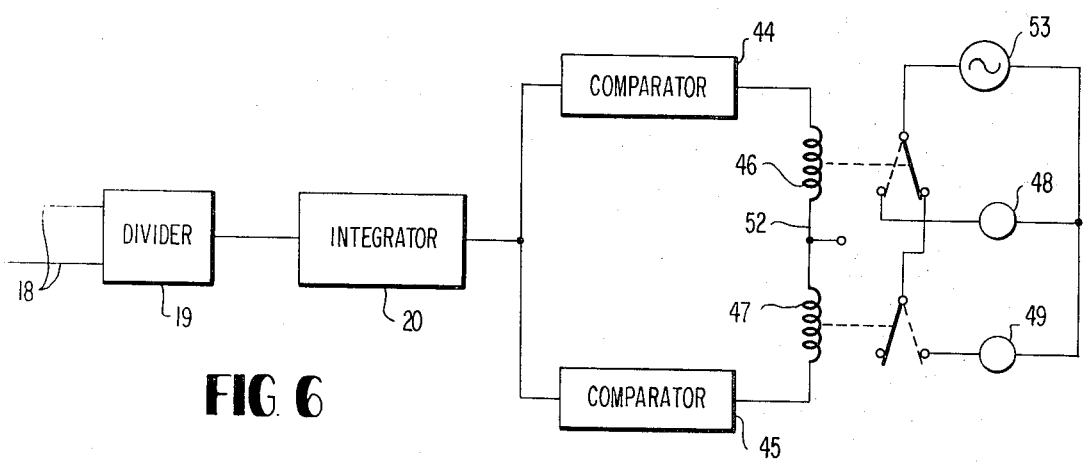
FIG. 6 is a diagramatic illustration of a modification of the system depicted in FIG. 4.

The embodiment of FIGS. 4 and 5 illustrate a system which indicates only when the conductivity of the discrete areas falls below a desired level. The block diagram of FIG. 6 describes an embodiment of this invention in which the system indicates when the conductivity of the discrete areas moves out of a desired range. Probes 18 are again connected to a divider circuit 19 which is connected to through an integrating circuit 20, two comparator circuits 44, 45 and relays 46, 47. Relays 46, 47 are connected to alarms 48, 49. A d.c. power source (similar to source 36 in FIG. 5) is connected to comparators 44 and 45. In operation, neither alarm is activated as long as comparator 44 is conducting and comparator 45 is non-conducting. When the magnitude of a continuous signal diminishes to a value less than a predetermined value, alarm 48 is activated via a.c. source 53. When the continuous signal reaches a value greater than a second predetermined value, comparator 45 becomes conducting and energizes relay 47 which activates alarm 49. Thus, the system responds to both an upper and lower value for the continuous signal thereby making it possible to monitor both upper and lower levels of application of the conductive material in the in-line operation.

It should now be apparent that it would be possible for one skilled in the art in light of the present description to adapt the system such that the applicator of the conductive material would in response to a changing continuous signal appropriately alter the amount of material being applied to the web. Similarly, the operation of the applicator could be stopped in response to a signal. Although the amplitude of the signals, both pulsed and continuous, is employed as a measure of conductivity, it would again be within the skill of those in the art, after a reading of the teachings set forth herein, to use other characteristics of the signals for monitoring the deposition amounts. Other modifications and advantages thereof will also be obvious. Although the preferred embodiments of the invention have been disclosed and described herein, it should be understood that this invention is to be determined by that of the appended claims and the spirit in which they are written in light of the disclosure herein.

We claim:

1. A system for monitoring the amount of conductive material applied in discrete areas which are repeated in a columnar pattern along the length of an endless web having at least one monitoring circuit comprising a. signal generating means including a pair of spaced probes for contacting the discrete areas in the columnar pattern as the web moves thereby, said generating means generating a pulsed signal having an amplitude which is proportional to the conductivity of a discrete area for each discrete area coming into contact with the pair of probes;
   b. integrating means responsive to the reception of pulsed signals from said generating means for integrating the pulsed signals into continuous signal; and
   c. comparing means responsive to the continuous signal received from said integrating means for indicating when the value of the integrated signal departs from a predetermined range of values.

2. The system of claim 1 including an alarm which is actuated by said comparing means when the continuous signal departs from the predetermined range of values.

3. The system of claim 1 wherein the comparing means includes a first circuit which is actuated when the continuous signal is less than a first predetermined value.

4. The system of claim 3 wherein the comparing means includes a second circuit which is actuated when the continuous signal is greater than a second predetermined value, the first predetermined value being less than the second predetermined value.

5. The system of claim 1 wherein the discrete areas are arranged in a plurality of columns along the length of the endless web and said system has a monitoring circuit for each column.

6. The system of claim 5 including a detecting means for detecting and indicating the presence of discrete areas which have dimensions along the length of the web greater than a predetermined dimension.

7. The system of claim 6 wherein the detecting means comprises an electric circuit which includes a pair of spaced, parallel probes positioned at right angles to the direction of web movement and in contact with the web along two lines across the web width, said probes being spaced apart a distance greater than the predetermined dimension of the discrete areas along the length of the web whereby the electric circuit is completed when an area of conductive material having a dimension sufficiently great to simultaneously contact both probes moves therebetween.

8. A method for monitoring the deposition of an endless, non-conductive web of a conductive coating in a preselected pattern having a columnar pattern of discrete areas running the length of the web comprising the steps of a. moving the web continuously by a monitoring position;
   b. electrically contacting each discrete area as it moves by the monitoring position and generating a series of pulsed signals, each pulse being proportional to the conductivity of a respective discrete area;
   c. integrating the series of pulsed signals into a continuous signal; and
   d. generating an indicating signal when the continuous signal deviates from a value predetermined to correspond to a conductivity value for the discrete areas, thereby providing an indication that the deposition of conductive coating has deviated from a desired amount of application.

9. The method of claim 8 wherein the step of electrically contacting and generating further comprises contacting each discrete area with a pair of spaced probes and passing an electrical current therebetween across the discrete area.

10. The method of claim 8 in which the web has a plurality of columns of discrete areas.

11. The method of claim 8 including the steps of continuously contacting the width of the web along two lines of contact spaced a distance apart greater than any predetermined discrete area dimension along the length of the web and generating an indicating signal in response to an electric current passing between the lines of contact along a conductive path on the web surface, due to the presence of an area of conductive material having a dimension large enough to contact both lines of contact simultaneously, thereby providing an indication that smearing of the conductive coating has occurred.

12. The method of claim 8 wherein the web is paper and the conductive coating is sodium chlorate.

13. The method of claim 8 wherein an indicating signal is generated when the continuous signal has a value above or below a predetermined range of values.

* * * * *